United States Patent Office 2,834,668
Patented May 13, 1958

2,834,668
MIXTURE FOR TREATING CAST IRON

Homer C. Barnes, Jr., Butler, and George P. Dahm, Linden, N. J., assignors to Union Carbide Corporation, a corporation of New York No Drawing. Application May 10, 1954
Serial No. 428,812

3 Claims. (Cl. 75—58)

This invention relates to a mixture for treating cast iron. More particularly, the invention relates to a mixture which may be injected into cast iron to effect the formation of nodules of free graphite in the cast iron.

Nodular cast iron is well known in the art. It is made by adding to cast iron under the proper conditions a quantity of a nodulizing agent and inoculating the cast iron. The treatment results in a cast iron in which free graphite appears in compacted or nodular form rather than as flakes. Recent discoveries have established that certain advantages accrue when the elements necessary to nodulize cast iron are injected into the cast iron in a stream of gas. In that process the gas carrying the additives passes through a tube into the cast iron.

It is the principal object of this invention to provide a mixture which may be utilized efficiently to nodulize cast iron. A further object is to provide a mixture which may be easily and economically injected into cast iron and which will simultaneously nodulize and inoculate the cast iron.

The objects of the invention are accomplished by providing a mixture containing a refractory diluent, a nodulizing agent and an inoculant.

The refractory diluent in the mixture is a material which does not melt at the temperature of the molten cast iron being treated. The diluent acts to prevent the plugging of the equipment by other constituents in the mixture which do melt or soften at that temperature. Among the diluents that have been found to be satisfactory are calcium carbide, magnesia, and calcium oxide. While the amount of diluent needed in the mixture of the invention will depend, for example, upon the temperature of the iron, the speed of the particles and the depth of the injection, in general a mixture containing between 40% and 70% by weight of the diluent is satisfactory.

As nodulizing agents magnesium and cerium are recommended by the art. They may be used in the mixture of the invention either alone or together and are preferably present in the form of an alloy. Magnesium-ferrosilicon and cerium-magnesium-ferrosilicon are examples of materials containing nodulizing agents that have given excellent results in the mixture.

To inoculate the cast iron, silicon must be present. The silicon may be in the form of an alloy, such as ferrosilicon or calcium silicon. A part, at least, of the necessary silicon may be alloyed with the nodulizing agent, as for example in magnesium-ferrosilicon. The amount of inoculant required in the mixture will be less of course when the iron being treated has a high silicon content. The amount of inoculant in the mixture should for best results be from 7 to 20 times the amount by weight of the nodulizing agent.

One mixture within the scope of the invention that has given excellent results has the following composition: 60% calcium carbide, 15% cerium-magnesium-ferrosilicon and 25% calcium silicon. In this mixture the cerium-magnesium-ferrosilicon has a silicon content of 50% and a combined cerium and magnesium content of 10%. The calcium ferrosilicon is 60% silicon.

The constituents are crushed and blended into a substantially homogeneous mixture. The crushed particles should be of a size such that they may be easily entrained in a stream of gas. Particles no larger than one-eighth of an inch have proven eminently satisfactory.

What is claimed is:

1. A mixture for treating cast iron comprising 40% to 70% by weight calcium carbide, and the remainder magnesium-ferrosilicon, and calcium silicon, the total amount of silicon in said mixture being by weight between 7 and 20 times the amount of magnesium in said mixture.

2. A mixture for treating cast iron comprising 40% to 70% by weight calcium carbide, and the remainder cerium-magnesium-ferrosilicon, and calcium-silicon, the total amount of silicon in said mixture being by weight between 7 and 20 times the combined amounts of cerium and magnesium in said mixture.

3. A mixture for treating cast iron comprising 40% to 70% by weight calcium carbide, calcium silicon and the remainder a magnesium-bearing ferrosilicon alloy, the total amount of silicon in said mixture being by weight between 7 and 20 times the amount of magnesium in said mixture.

References Cited in the file of this patent

UNITED STATES PATENTS

| | | |
|---|---|---|
| 2,569,146 | Bolkcom | Sept. 25, 1951 |
| 2,663,635 | Busby | Dec. 22, 1953 |
| 2,671,019 | Du Rostu | Mar. 2, 1954 |
| 2,747,990 | Morrogh | May 29, 1956 |

FOREIGN PATENTS

| | | |
|---|---|---|
| 514,115 | Belgium | Sept. 30, 1952 |